United States Patent
Cockcroft et al.

(10) Patent No.: US 11,157,285 B2
(45) Date of Patent: Oct. 26, 2021

(54) DYNAMIC MODIFICATION OF INSTRUCTIONS THAT DO NOT MODIFY THE ARCHITECTURAL STATE OF A PROCESSOR

(71) Applicant: International Business Machines Corporation, Armonk, NY (US)

(72) Inventors: Bryant Cockcroft, Austin, TX (US); John A. Schumann, Austin, TX (US); Karen Yokum, Austin, TX (US); Vivek Britto, Austin, TX (US); Debapriya Chatterjee, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 16/783,347

(22) Filed: Feb. 6, 2020

(65) Prior Publication Data

US 2021/0247982 A1 Aug. 12, 2021

(51) Int. Cl.
*G06F 9/44* (2018.01)
*G06F 9/38* (2018.01)

(52) U.S. Cl.
CPC .......... *G06F 9/3814* (2013.01); *G06F 9/3836* (2013.01)

(58) Field of Classification Search
CPC ........ G06F 9/3814; G06F 9/3836; G06F 9/30; G06F 9/44
See application file for complete search history.

(56) References Cited

U.S. PATENT DOCUMENTS

| | | | | |
|---|---|---|---|---|
| 4,847,753 A | * | 7/1989 | Matsuo | G06F 9/3806 712/238 |
| 5,377,336 A | * | 12/1994 | Eickemeyer | G06F 9/383 711/213 |
| 5,542,058 A | * | 7/1996 | Brown, III | G06F 9/3824 712/23 |
| 5,694,568 A | * | 12/1997 | Harrison, III | G06F 9/383 711/137 |
| 5,734,854 A | * | 3/1998 | Chan | G06F 9/30145 712/205 |
| 5,784,711 A | * | 7/1998 | Chi | G06F 9/30105 711/123 |
| 5,802,569 A | * | 9/1998 | Genduso | G06F 9/3802 711/137 |
| 6,401,192 B1 | | 6/2002 | Schroter et al. | |
| 6,452,693 B1 | * | 9/2002 | Isoda | G06F 3/1236 358/1.16 |
| 6,557,081 B2 | * | 4/2003 | Hill | G06F 9/383 711/137 |
| 6,760,817 B2 | | 7/2004 | Arimilli et al. | |

(Continued)

*Primary Examiner* — Cheng Yuan Tseng
(74) *Attorney, Agent, or Firm* — Scully, Scott, Murphy & Presser, P.C.

(57) ABSTRACT

A system and method including a processor configured to, based on encountering an instruction that does not modify the architectural state of the processor, preferably a prefetch instruction, that is being executed by the processor, determine whether utilization of a first queue used in processing the instruction is over a first queue utilization limit; in response to the first queue utilization being over the first queue utilization limit, do not execute the prefetch instruction; and in response to the first queue utilization being under the first queue utilization limit, at least partially process the prefetch instruction.

18 Claims, 6 Drawing Sheets

(56) References Cited

U.S. PATENT DOCUMENTS

| | | | |
|---|---|---|---|
| 6,918,111 B1* | 7/2005 | Damron | G06F 8/4442 |
| | | | 712/200 |
| 6,934,809 B2* | 8/2005 | Tremblay | G06F 9/383 |
| | | | 711/137 |
| 7,032,101 B2* | 4/2006 | Gschwind | G06F 9/3836 |
| | | | 712/207 |
| 7,137,111 B2* | 11/2006 | Damron | G06F 9/3842 |
| | | | 717/159 |
| 8,244,978 B2 | 8/2012 | Kegel et al. | |
| 8,521,982 B2* | 8/2013 | Cargnoni | G06F 12/084 |
| | | | 711/169 |
| 8,762,649 B2* | 6/2014 | Hooker | G06F 9/3814 |
| | | | 711/137 |
| 9,015,422 B2* | 4/2015 | Meier | G06F 12/0862 |
| | | | 711/137 |
| 9,043,579 B2 | 5/2015 | Heisch | |
| 9,904,624 B1* | 2/2018 | Huberty | G06F 12/0811 |
| 10,042,749 B2 | 8/2018 | Gschwind et al. | |
| 10,078,514 B2* | 9/2018 | Eickemeyer | G06F 9/3802 |
| 10,133,571 B1* | 11/2018 | Kesiraju | G06F 9/30043 |
| 10,169,239 B2* | 1/2019 | Greiner | G06F 12/0862 |
| 10,331,567 B1* | 6/2019 | Meier | G06F 12/12 |
| 10,402,334 B1* | 9/2019 | Meier | G06F 12/0862 |
| 10,474,576 B2* | 11/2019 | Gschwind | G06F 12/0862 |
| 10,621,100 B1* | 4/2020 | Meier | G06F 12/0862 |
| 10,929,297 B2* | 2/2021 | Gschwind | G06F 12/0842 |
| 2016/0179544 A1 | 6/2016 | Heinecke et al. | |
| 2020/0272566 A1* | 8/2020 | Saeki | G06F 16/903 |

* cited by examiner

DYNAMIC MODIFICATION OF INSTRUCTIONS THAT DO NOT MODIFY THE ARCHITECTURAL STATE OF A PROCESSOR

BACKGROUND

The present techniques relate to processors. More specifically, the techniques relate to handling of instructions, such as for example prefetch and cache management instructions, that do not modify the architectural state of processors.

Cache memory may significantly improve performance of computer processors, also referred to as microprocessors. Generally, a cache is a relatively small, fast memory used by a central processing unit (CPU) or processor of a computer that is used to avoid accesses to the computer's main memory. The cache may store instructions and/or copies of data from frequently used main memory locations. By keeping more frequently accessed instructions and data in the faster cache memory, the average memory access time may approach the access time of the cache. A cache miss may be costly because the data must then be fetched from a higher-level cache, main memory, or another processor's cache in a multiprocessor system, which may incur a delay since accessing another memory generally is slower than accessing a processor's local cache memory.

A mechanism used to enhance the performance of cache memory is data prefetching.

Data prefetching generally refers to moving data from memory to cache in anticipation of future accesses by the processor to the data. That is, data prefetching requests data from the memory subsystem before the data is needed. Because microprocessors tend to be much faster than the memory where the program or data is stored, the program's instructions or data cannot be read fast enough to keep the microprocessor busy. By prefetching, the processor has the data from the memory before it will need it. In this way, the processor will not need to wait for memory to provide the requested data. If the correct data can be prefetched early enough, then the high latency of main memory can be hidden.

Another mechanism used to enhance the performance of cache memory is address translation or translation prefetching. Translation prefetching generally refers to moving address translation data from memory to cache in anticipation of future accesses by the processor to those memory addresses. That is, translation prefetching requests retrieve requested virtual address translations to real address translations and loads the address translations into cache, for example, a translation lookaside buffer (TLB). By prefetching the address translations, the processor has the translations from memory before it will need it. In this way, the processor will not need to wait for memory to provide the requested translation.

SUMMARY

The summary of the disclosure is given to aid understanding of a computer system, computer architectural structure, processor, and memory systems, and not with an intent to limit the disclosure of the invention. The present disclosure is directed to a person of ordinary skill in the art. It should be understood that various aspects and features of the disclosure may advantageously be used separately in some instances, or in combination with other aspects and features of the disclosure in other instances. Accordingly, variations and modifications may be made to the computer system, the architectural structure, processor, or memory systems, and their method of operation, to achieve different effects.

In one or more embodiments a system is described where the system includes a processor configured to, based on encountering a prefetch instruction that is being executed by the processor, determine whether utilization of a first queue used in processing the prefetch instruction is over a first queue utilization limit; in response to the first queue utilization being over the first queue utilization limit, not execute the prefetch instruction; and in response to the first queue utilization being under the first queue utilization limit, at least partially process the prefetch instruction. The system in an aspect, in response to the first queue utilization being over the first queue utilization limit, marks the prefetch instruction complete notwithstanding that the prefetch instruction is not executed. The prefetch instruction in an embodiment is a translation prefetch instruction in software. The processor in an aspect is further configured to: based on the first queue utilization being under the first queue utilization limit, determine whether utilization of a second queue used in processing the prefetch instruction is over a second queue utilization limit; in response to the second queue utilization being over the second queue utilization limit, perform no further execution of the prefetch instruction; and in response to the second queue utilization being under the second queue utilization limit, at least partially further process the prefetch instruction. The processor in an aspect is further configured to: based on the second queue utilization being under the second queue utilization limit, determine whether utilization of a third queue used in processing the prefetch instruction is over a third queue utilization limit; in response to the third queue utilization being over the third queue utilization limit, perform no further execution of the prefetch instruction; and in response to the third queue utilization being under the third queue utilization limit, at least partially further process the prefetch instruction. The first queue in an embodiment is a load queue, and in a further aspect the second queue is at least one of the group comprising a translation queue and a load-miss queue.

A computer-implemented method is disclosed that in one or more embodiments, based on executing by a processor an instruction that does not modify the architectural state of the processor, includes: determining, by the processor, whether a first performance criteria used in processing the instruction is over a first performance threshold; in response to the first performance criteria being over the first performance threshold, not executing the instruction; and in response to the first performance criteria being under the first performance threshold, at least partially processing the instruction. The instruction in an embodiment is at least one of the group consisting of a prefetch instruction, a cache management instruction, and combinations thereof. The computer-implemented method in an aspect further includes, in response to the first performance criteria being over the first performance threshold, marking the instruction complete notwithstanding that the instruction is not executed. The first performance criteria in an aspect is at least one of the group comprising: how full at least one queue is that is used to process the instruction, load bandwidth, processor power utilization, the frequency at which the instruction increases performance, and combinations thereof. The instruction in a further aspect is a translation prefetch instruction and the first performance criteria is at least one of the group comprising utilization of a load queue, utilization of a translation queue, utilization of a load-miss queue, and combinations thereof. The computer-implemented method further including: based on the first performance criteria being under the first performance threshold, determine whether a second performance criteria used in processing the instruction is over a second performance threshold; in response to the second performance criteria being over the second performance threshold, do not further execute the instruction; and in response to the second performance criteria being under the second performance threshold, at least partially further process the instruction. In a further embodiment, the computer-implemented method further including based on the second performance criteria being under the second performance threshold, determine whether a third performance criteria used in processing the instruction is over a third performance threshold; in response to the third performance criteria being over the third performance threshold, do not further execute the instruction; and in response to the third performance criteria being under the third performance threshold, at least partially further process the instruction.

An apparatus is disclosed in an embodiment that has hardware logic configured to, based on encountering a prefetch instruction that is being executed by the processor, determine whether utilization of a first queue used in processing the prefetch instruction is over a first queue utilization limit; in response to the first queue utilization being over the first queue utilization limit, do not execute the prefetch instruction; based on determining the first queue utilization is under the first queue utilization limit, determine whether utilization of a second queue used in processing the instruction is over a second queue utilization limit; in response to the second queue utilization being over the second queue utilization limit, do not further execute the instruction; and in response to the second queue utilization being under the second queue utilization limit, at least partially further process the instruction. The hardware logic is configured in an embodiment to process the prefetch instruction and the prefetch instruction is a translation prefetch instruction in software. The first queue utilization in an aspect is at least one of the group that includes utilization of a load queue, utilization of a translation queue, utilization of a load-miss queue, and combinations thereof. The hardware logic is configured to: based on the second queue utilization being under the second queue utilization limit, determine whether utilization of a third queue used in processing the instruction is over a third queue utilization limit; in response to the third queue utilization being over the third queue utilization limit, do not further execute the instruction; and in response to the third queue utilization being under the third queue limit, at least partially further process the instruction.

The foregoing and other objects, features and advantages of the invention will be apparent from the following more particular descriptions of exemplary embodiments of the invention as illustrated in the accompanying drawings.

BRIEF DESCRIPTION OF THE DRAWINGS

Embodiments are provided in the figures for the purpose of illustrating aspects, features, and/or various embodiments of the computer system, computer architectural structure, processors, and memory systems, but the claims should not be limited to the precise arrangement, structures, features, aspects, assemblies, subassemblies, systems, circuitry, embodiments, devices, methods, processes, and/or techniques shown, and the arrangements, structures, systems, assemblies, subassemblies, features, aspects, circuitry, embodiments, devices, methods, processes, and/or techniques shown may be used singularly or in combination with other arrangements, structures, assemblies, subassemblies, systems, features, aspects, circuitry, embodiments, devices, methods, techniques, and/or processes.

DETAILED DESCRIPTION

The following description is made for illustrating the general principles of the invention and is not meant to limit the inventive concepts claimed herein. In the following detailed description, numerous details are set forth in order to provide an understanding of the computer system, computer architectural structure, processor, and memory systems, and their method of operation, however, it will be understood by those skilled in the art that different and numerous embodiments of the computer system, computer architectural structure, processor, and memory systems, and their method of operation may be practiced without those specific details, and the claims and disclosure should not be limited to the arrangements, structures, systems, assemblies, subassemblies, circuitry, features, embodiments, aspects, processes, methods, techniques, and/or details specifically described and shown herein. Further, particular features, aspects, arrangements, systems, circuitry, embodiments, functional units, techniques, processes, etc. described herein can be used in combination with other described features, aspects, arrangements, systems, circuitry, embodiments, functional units, techniques, processes, etc. in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc. It must also be noted that, as used in the specification and the appended claims, the singular forms "a," "an" and "the" include plural referents unless otherwise specified, and that the terms "comprises" and/or "comprising," when used in this specification and claims, specify the presence of stated features, integers, aspects, arrangements, embodiments, structures, systems, assemblies, subassemblies, functional units, circuitry, elements, components, steps, operations, processes, techniques, and/or methods, but do not preclude the presence or addition of one or more other features, integers, aspects, arrangements, embodiments, structures, systems, assemblies, subassemblies, functional units, circuitry, elements, components, steps, operations, processes, techniques, methods, and/or groups thereof.

The following discussion omits or only briefly describes conventional features of information processing systems, including processors, microprocessors, memory systems, and their architectures, as well as prefetching and address translation techniques and systems, which should be apparent to those skilled in the art. It is assumed that those skilled in the art are familiar with the general architecture of processors, memory (including cache) systems, and their operation. It may be noted that a numbered element is numbered according to the figure in which the element is introduced, and is typically referred to by that number throughout succeeding figures.

During processing of instructions by a processor, there are instructions that do not modify the architectural state of the processor, such as, for example, cache management and prefetch instructions, but only change the micro-architectural state of the processor for performance benefits. These instructions do not otherwise affect the accuracy of executing a program. These instructions that do not modify the architectural state of the processor are useful performance tools that can for example put cache in a more optimal state, provide hints to the hardware about what memory will be accessed in the future, and other various actions to enhance processor performance. These instructions, however, consume resources and can sacrifice performance while being executed. The sacrifice in performance while being executed should be either negligible or result in more significant gains later, however, that is not always the case. In circumstances, execution of cache management instructions, prefetch instructions, or other performance enhancing instructions that do not affect the architectural state of the processor, hurt performance.

A system and method to dynamically modify, change, and/or degrade non-architectural instructions when conditions are such that their execution will result, or is likely to result, in decreased performance is disclosed. Such non-architectural instructions include, but are not limited to prefetch instructions, cache management instructions or operations, and other instructions that do not modify the architectural state of the processor. The advantages of modifying, changing, or degrading the handling of these instructions that do not modify the architectural state of the processor include that software and processor performance will not be hurt (or at least hurt less) by these instructions that are intended to increase performance, but which in circumstances harm performance.

Since instructions that do not modify any architected state of the processor can be entirely ignored by the hardware and still achieve the correct functional results expected by the software, in one or more embodiments such instructions can be blocked, cancelled, marked complete, or otherwise not performed. In other instances, even if the entire instruction is not completed, performance of some intermediate work or portions of the instruction can be useful. The amount of the instruction to complete, and/or whether to end the operation early can be determined dynamically. In this regard, instructions that do not modify the architectural state of the processor can be completely skipped (cancelled, ignored, blocked, marked complete even if not performed, etc.), executed in some partial manner, modified, or fully executed.

Figure 1:
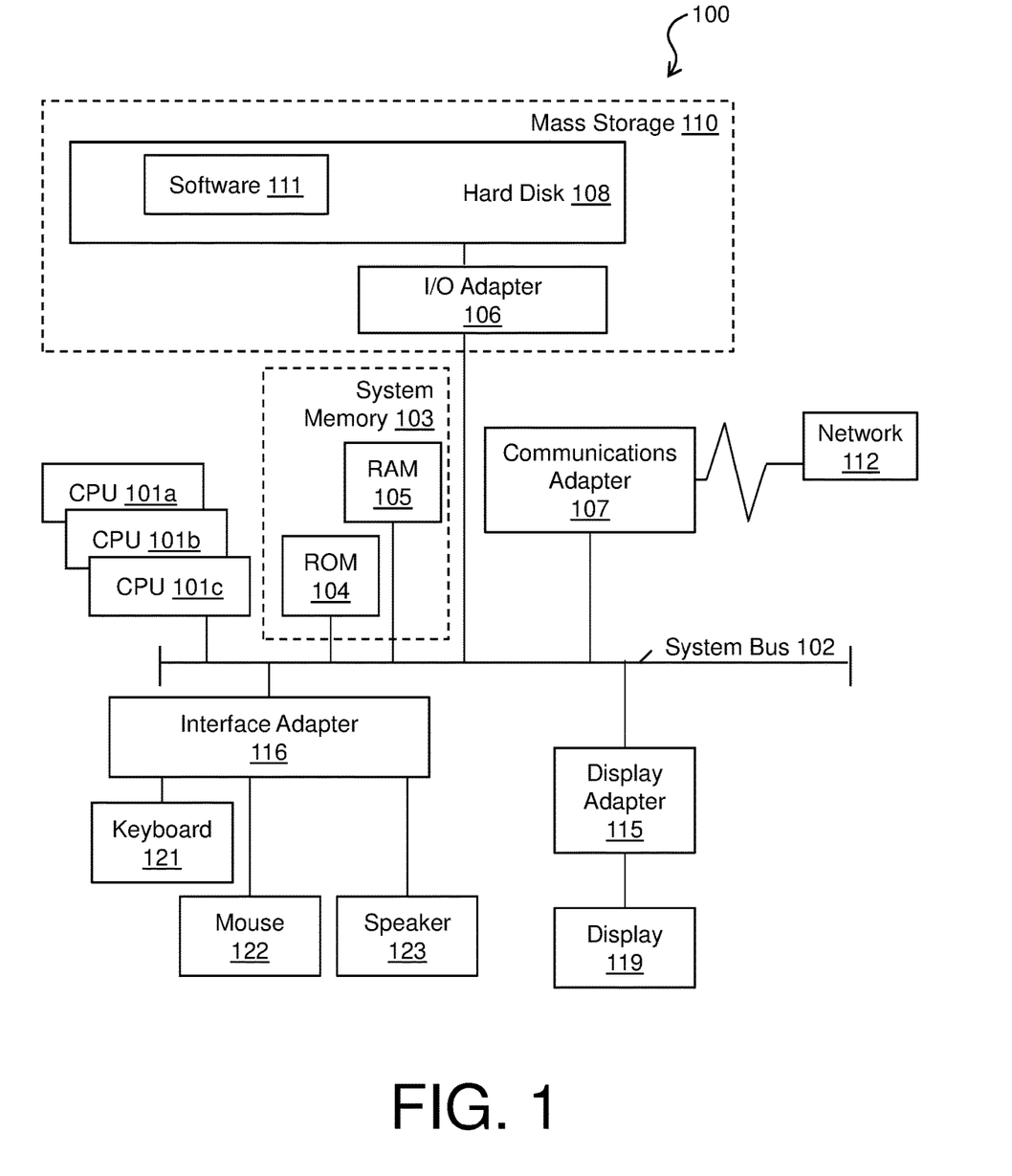
FIG. 1 is a block diagram of an example computer system.

Turning now to FIG. 1, a computer system 100 is generally shown in accordance with an embodiment. The computer system 100 can be an electronic, computer framework comprising and/or employing any number and combination of computing devices and networks utilizing various communication technologies, as described herein. The computer system 100 can be easily scalable, extensible, and modular, with the ability to change to different services or reconfigure some features independently of others. The computer system 100 may be, for example, a server, desktop computer, laptop computer, tablet computer, or smartphone. In some examples, computer system 100 may be a cloud computing node. Computer system 100 may be described in the general context of computer system executable instructions, such as program modules, being executed by a computer system. Generally, program modules may include routines, programs, objects, components, logic, data structures, and so on that perform particular tasks or implement particular abstract data types. Computer system 100 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, the computer system 100 has one or more central processing units (CPU(s)) 101a, 101b, 101c, etc. (collectively or generically referred to as processor(s) 101). The processors 101 can be a single-core processor, multi-core processor, computing cluster, or any number of other configurations. The processors 101, also referred to as processing circuits, are coupled via a system bus 102 to a system memory 103 and various other components. The system memory 103 can include a read only memory (ROM) 104 and a random access memory (RAM) 105. The ROM 104 is coupled to the system bus 102 and may include a basic input/output system (BIOS), which controls certain basic functions of the computer system 100. The RAM is read-write memory coupled to the system bus 102 for use by the processors 101. The system memory 103 provides temporary memory space for operations of said instructions during operation. The system memory 103 can include random access memory (RAM), read only memory, flash memory, or any other suitable memory systems.

The computer system 100 comprises an input/output (I/O) adapter 106 and a communications adapter 107 coupled to the system bus 102. The I/O adapter 106 may be a small computer system interface (SCSI) adapter that communicates with a hard disk 108 and/or any other similar component. The I/O adapter 106 and the hard disk 108 are collectively referred to herein as a mass storage 110.

Software 111 for execution on the computer system 100 may be stored in mass storage 110. Mass storage 110 is an example of a tangible storage medium readable by the processors 101, where the software 111 is stored as instructions for execution by the processors 101 to cause the computer system 100 to operate, such as is described herein below with respect to the various Figures Examples of computer program product and the execution of such instruction is discussed herein in more detail. The communications adapter 107 interconnects the system bus 102 with a network 112, which may be an outside network, enabling the computer system 100 to communicate with other such systems. In one embodiment, a portion of the system memory 103 and the mass storage 110 collectively store an operating system, which may be any appropriate operating system, such as z/OS or AIX operating system from IBM Corporation, to coordinate the functions of the various components shown in FIG. 1.

Additional input/output devices are shown as connected to the system bus 102 via a display adapter 115 and an interface adapter 116. In one embodiment, the adapters 106, 107, 115, and 116 may be connected to one or more I/O buses that are connected to the system bus 102 via an intermediate bus bridge (not shown). A display 119 (e.g., a screen or a display monitor) is connected to the system bus 102 by a display adapter 115, which may include a graphics controller to improve the performance of graphics intensive applications and a video controller. A keyboard 121, a mouse 122, a speaker 123, etc. can be interconnected to the system bus 102 via the interface adapter 116, which may include, for example, a Super I/O chip integrating multiple device adapters into a single integrated circuit. Suitable I/O buses for connecting peripheral devices such as hard disk controllers, network adapters, and graphics adapters typically include common protocols, such as the Peripheral Component Interconnect (PCI). Thus, as configured in FIG. 1, the computer system 100 includes processing capability in the form of processors 101, and storage capability including system memory 103 and mass storage 110, input means such as keyboard 121 and mouse 122, and output capability including speaker 123 and display 119.

In some embodiments, the communications adapter 107 can transmit data using any suitable interface or protocol, such as the internet small computer system interface, among others. The network 112 may be a cellular network, a radio network, a wide area network (WAN), a local area network (LAN), or the Internet, among others. An external computing device may connect to the computing system 100 through the network 112. In some examples, an external computing device may be an external webserver or a cloud computing node.

It is to be understood that the block diagram of FIG. 1 is not intended to indicate that the computer system 100 is to include all of the components shown in FIG. 1. Rather, the computer system 100 can include any appropriate fewer or additional components not illustrated in FIG. 1 (e.g., additional memory components, embedded controllers, modules, additional network interfaces, etc.). Further, the embodiments described herein with respect to computer system 100 may be implemented with any appropriate logic, wherein the logic, as referred to herein, can include any suitable hardware (e.g., a processor, an embedded controller, or an application specific integrated circuit, among others), software (e.g., an application, among others), firmware, or any suitable combination of hardware, software, and firmware, in various embodiments.

Figure 2:
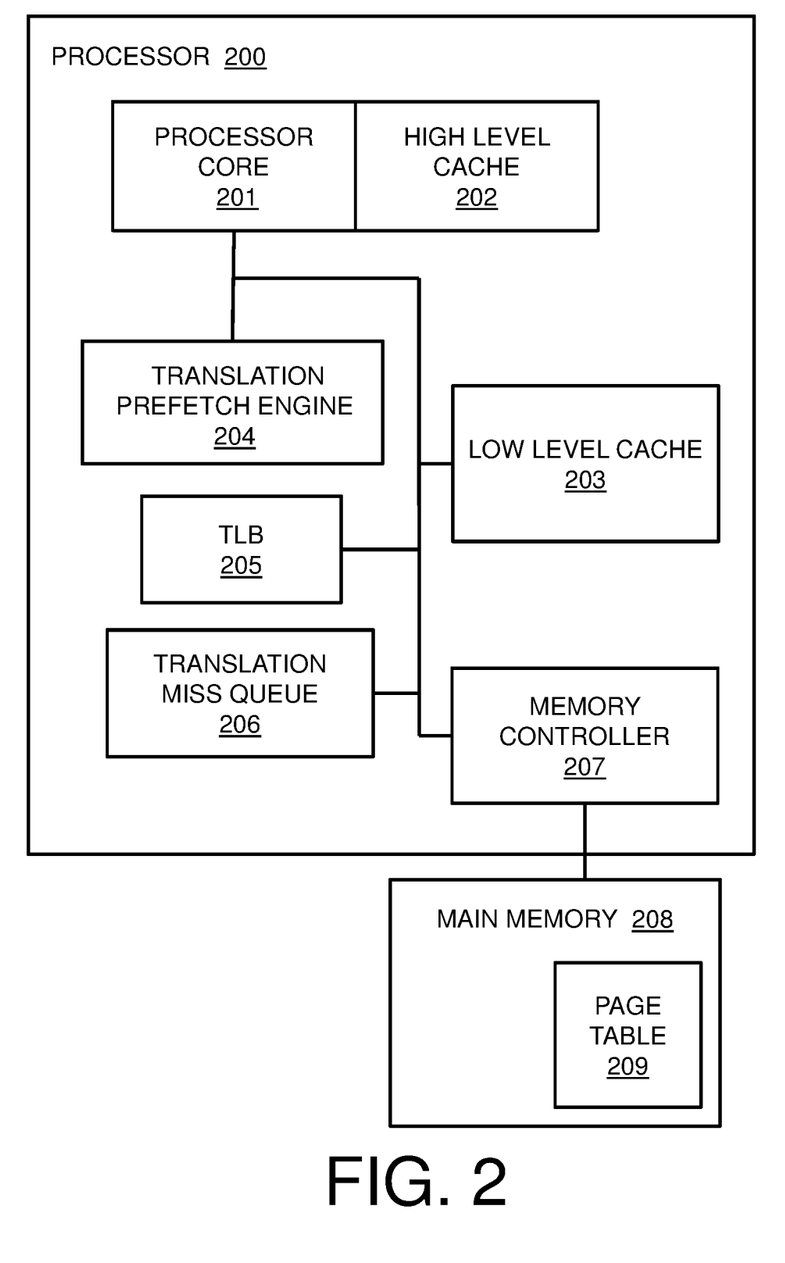
FIG. 2 is a block diagram of an example system for prefetching address translation instructions.

FIG. 2 is a block diagram of an example system comprising a processor 200 for prefetching address translation instructions, including software translation prefetch instructions. Processor 200 of FIG. 2 may comprise processor(s) 101 of computer system 100 of FIG. 1. Processor 200 includes a processor core 201, which may include an instruction pipeline for execution of instructions during the execution of software in the computer system (e.g., software 111 of FIG. 1) in which the processor 200 is located. The processor core 201 is in communication with a high level cache 202, which may be a relatively small, fast memory for use by the processor core 201 during execution of instructions. The processor 200 further includes a low level cache 203, which also stores data for use by the processor core 201 during execution of instructions. The low level cache 203 may be a larger, slower memory than the high level cache 202. High level cache 202 and low level cache 203 are shown for illustrative purposes only; a processor 200 may include any appropriate number of levels of cache in various embodiments. Processor 200 is also in communication with a main memory 208 via a memory controller 207. Main memory 208 may correspond to system memory 103 of FIG. 1. Data is read from and written to the main memory 208 by the processor 200 via memory controller 207 during execution of software. Accessing data in the main memory 208 may be relatively slow as compared to low level cache 203. In order to expedite execution of instructions by processor core 201, data may be prefetched from the main memory 208 to the cache memory (e.g., low level cache 203 and/or high level cache 202) in the processor 200 for use by the processor core 201.

Processor 200 further includes a translation prefetch engine 204, which may handle translation prefetch instructions that are encountered during execution of the software 111. A translation prefetch instruction may be part of the ISA of the processor 200, and a plurality of translation prefetch instructions may be included in software 111 by a programmer. The translation prefetch engine 204 is in communication with a TLB 205 and a translation miss queue 206 of the processor 200. A translation prefetch instruction causes the translation prefetch engine to prefetch an address translation (e.g., a translation from a virtual memory address to a real memory address) from page table 209 in the main memory 208 for storage in the TLB 205. The processor core 201 may then access the address translation in the TLB 205 when the address translation is needed. In some embodiments, a translation prefetch instruction may cause an address translation to be stored in a cache of the processor 200, e.g., low level cache 203 or high level cache 202. Translation prefetch engine 204 is discussed in further detail below with respect to FIG. 3 and FIG. 4.

It is to be understood that the block diagram of FIG. 2 is not intended to indicate that the processor 200 is to include all of the components shown in FIG. 2. Rather, the processor 200 can include any appropriate fewer or additional components not illustrated in FIG. 1 (e.g., additional memory components, cores, controllers, modules, logic, interfaces, etc.). Further, the embodiments described herein with respect to processor 200 may be implemented with any appropriate logic, wherein the logic, as referred to herein, can include any suitable hardware (e.g., a processor, an embedded controller, or an application specific integrated circuit, among others), software (e.g., an application, among others), firmware, or any suitable combination of hardware, software, and firmware, in various embodiments.

A mechanism used to enhance the performance of cache memory is data prefetching.

Data prefetching generally refers to moving data from memory to cache in anticipation of future accesses by the processor to the data. Data prefetching requests data from the memory subsystem before the data is needed. By prefetching, the processor has the data from memory before it will need it. In this way, the processor will not need to wait for memory to provide the required data. If the correct data can be prefetched early enough, then the high latency of main memory can be hidden.

Processors may include specialized hardware elements to support implementation of virtual memory. Such processors produce virtual addresses, and implement virtual address to physical address translation mechanisms to map virtual addresses to physical addresses. The address translation mechanism may include one or more data structures (e.g., page tables) arranged to form a hierarchy. The page tables may be stored in main memory and in one or more embodiments are maintained by the operating system software. Where multiple page tables are used to perform the virtual-to-physical address translation, a highest-ordered page table may be located within the main memory, and entries in the highest-ordered page table are base addresses of (indexes into) other page tables. Any additional page tables may be stored in a storage unit. When additional page tables are needed, they are obtained from the storage unit and stored in main memory.

The virtual-to-physical address translation mechanism requires accessing one or more page tables in main memory (i.e., via page table lookups, or table walks). Such page table accesses may require significant amounts of time, and may negatively impact processor performance. Consequently, processors may include a translation lookaside buffer (TLB) for storing recently used page table entries. The TLB is a cache in a central processing unit (CPU) that contains translations of virtual addresses into real memory addresses. The TLB improves the speed of virtual address translation because it stores, or caches, translated virtual to physical address mappings. The search key of the TLB may be a virtual address, and the result that is output by a TLB search is the corresponding physical address. If a TLB search yields a match, the virtual to physical address translation is known and the physical address is used. If there is no match (i.e., a TLB miss), a translation request using the page table in main memory (memory that is not local to the processor) needs to be performed. Processing a translation request in main memory may take additional cycles to complete. Therefore, data fetching or data prefetching may be delayed when data is requested that is at a memory location that is not mapped in the TLB.

A translation prefetch instruction may be added to an instruction set architecture (ISA) of a processor to reduce wait times associated with accessing relatively slow memories in the computer system. Address translations may be prefetched to the TLB automatically by a processor if, for example, prefetching logic discerns a pattern in the address translations that are used by a particular software program. Addition of translation prefetch instructions to the ISA of the processor allows address translations to be prefetched if there is no discernable pattern. A programmer may insert translation prefetch instructions into software to ensure that address translations are prefetched for, for example, a subsequent data prefetch instruction in the software. Use of software translation prefetch instructions may provide an advantage when working with a data set in which the addresses in memory are discoverable in advance, yet do not show any discernible pattern which might be caught by hardware prefetching logic. By including multiple levels of software translation prefetching into computer code, the number of TLB misses and the average latency penalty may be reduced. A translation prefetch engine that handles the translation prefetch instructions may interface with, for example, a table walk unit to retrieve a requested virtual address translation. The table walk unit accesses one or more page tables, which may be stored in the main memory, to identify the virtual-to-physical address translation corresponding to a translation request.

A first software prefetch instruction for a virtual address may go through address translation. In a hot page type scenario, where a relatively large number of memory pages are accessed continuously, address translation may be a bottleneck that holds up execution in the processor. While all data accesses may be cache hits, the penalty incurred by being forced to table walk on every data access to obtain an address translation may negate a large amount of the potential gain from data prefetching. Prefetching address translation instructions, e.g., translation prefetch instructions, allows for the fetching of an address translation via a table walk without holding up the rest of the instruction pipeline. A translation prefetch instruction may prime an address translation for use by, for example, a subsequent data prefetch instruction in the software, or a demand load.

In some embodiments, separate instructions may load an address translation into both the TLB and a higher level translation cache. A translation prefetch instruction in an embodiment passes through the processor pipeline until the translation prefetch instruction is loaded into an entry in the translation miss queue, at which point in an aspect the translation prefetch instruction is finished (e.g., retired or completed) in the processor pipeline. After the translation prefetch instruction is loaded into the entry in the translation miss queue, in one or more embodiments the address translation corresponding to the translation prefetch instruction is performed, which may include a table walk. Retiring of the translation prefetch instruction in the processor pipeline avoids any holdup of other instructions in the processor pipeline due to, for example, limited reorder buffer entries or other resources in the processor pipeline. The address translation, including any table walk, in one or more embodiments occurs independently of any other instructions in the processor pipeline. Once the address translation is completed, the address translation will be loaded into the TLB (and/or higher level translation cache), and the translation miss queue entry is freed. The address translation will then be available for, for example, any subsequent data fetch or prefetch instructions to use.

Figure 3:
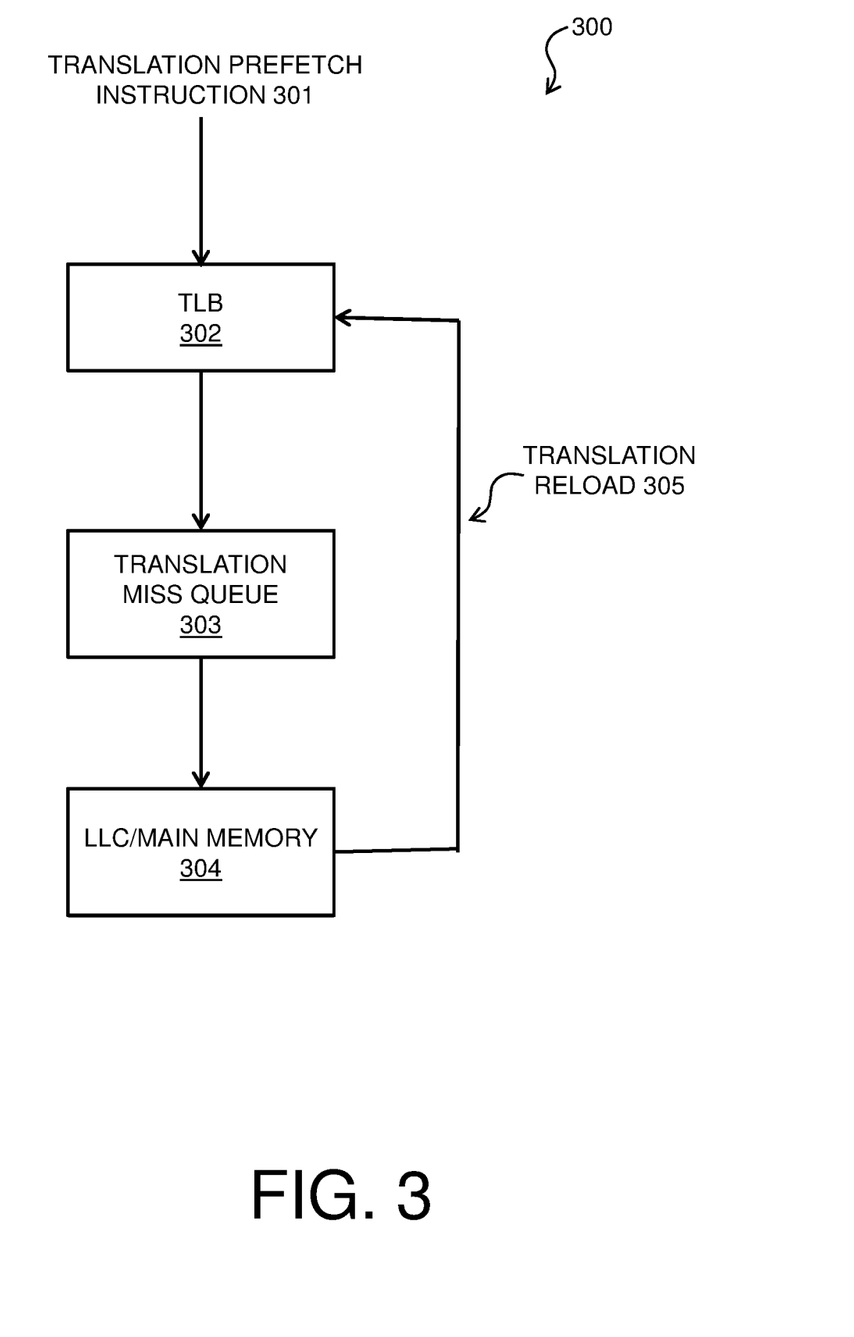
FIG. 3 is a process flow diagram of an example method for prefetching address translation instructions.

FIG. 3 is a process flow diagram of an example method 300 for translation prefetch instructions, including software translation prefetch instructions. The method 300 can be implemented with any suitable computing device, such as the computer system 100 of FIG. 1. Method 300 of FIG. 3 may be implemented in processor 200 of FIG. 2. Method 300 illustrates handling of a translation prefetch instruction 301. When the translation prefetch instruction 301 is encountered in software (such as software 111 of FIG. 1), the processor pipeline notifies the translation prefetch engine 204 to search the TLB 302 for the translation. The search may be performed based on a virtual address associated with the translation prefetch instruction. TLB 302 may correspond to TLB 205 of FIG. 2. The TLB 302 may include a plurality of entries, each entry including a virtual memory address and an associated real memory address. If the requested translation is found in the TLB 302 (i.e., there is a TLB hit), there is no need to prefetch the address translation corresponding to the translation prefetch instruction 301 from main memory, and method 300 ends. If the translation is not found in the TLB (i.e., there is a TLB miss), a translation request corresponding to the translation prefetch instruction 301 is stored in an entry in the translation miss queue 303. The translation miss queue 303 may correspond to translation miss queue 206 of FIG. 2. Entries in the translation miss queue 303 are processed by accessing page tables (e.g., page table 209), which may be located in a main memory/lowest level cache 304 (e.g., main memory 208 or low level cache 203) of the processor 200. When the translation corresponding to the translation prefetch instruction 301 has been performed, in one or more aspects there is a translation reload 305, in which the translation corresponding to the translation prefetch instruction 301 is stored in the TLB 302 for use by the processor core 201. After the translation reload 305 has been performed, the entry in the translation miss queue 303 is released, and method 300 ends for the particular translation prefetch instruction 301. Each translation prefetch instruction that is encountered by the processor 200 in one or more embodiments can be handled according to method 300.

The process flow diagram of FIG. 3 is not intended to indicate that the operations of method 300 are to be executed in any particular order, or that all of the operations of method 300 are to be included in every case. Additionally, method 300 can include any suitable number of additional operations.

Figure 4:
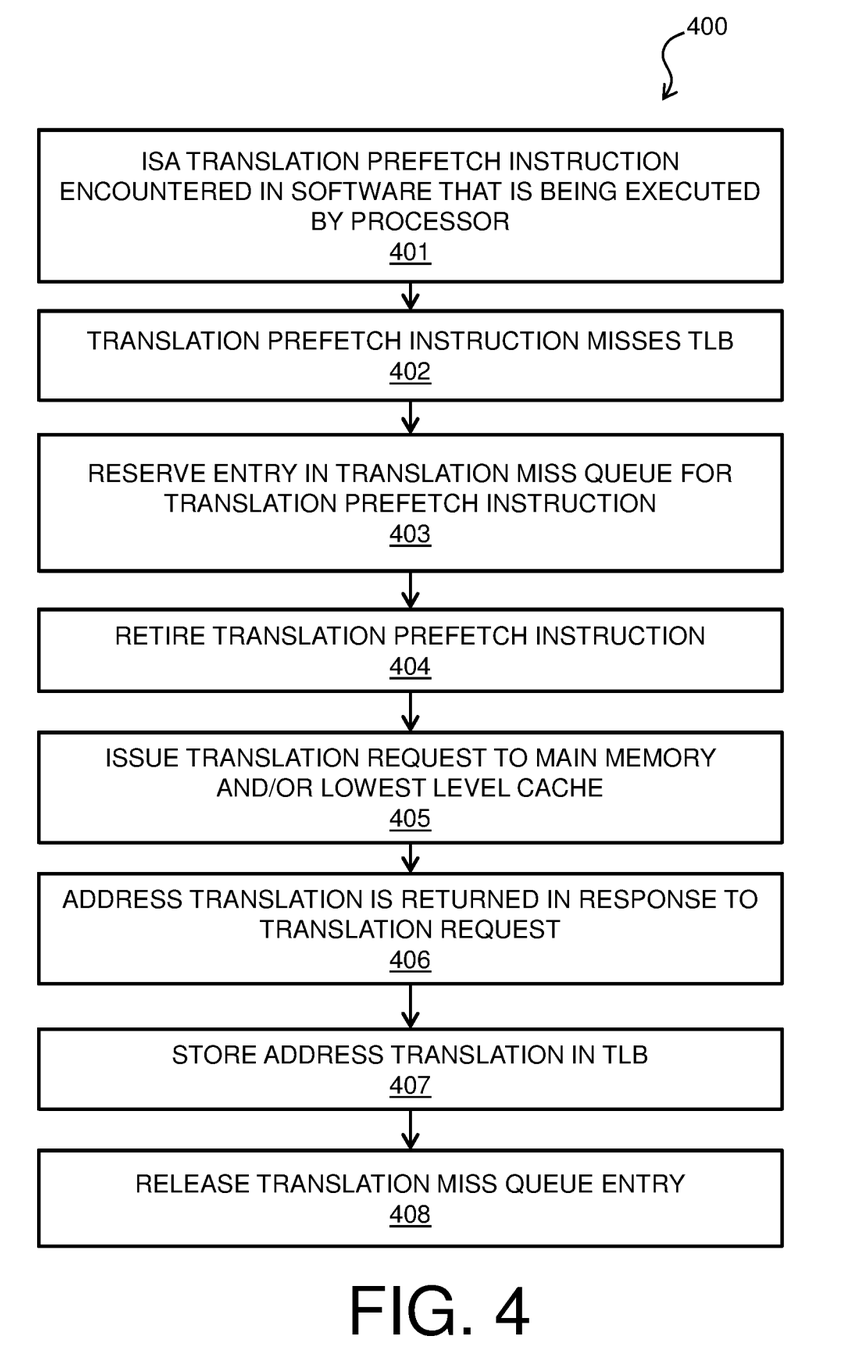
FIG. 4 is a process flow diagram of another example method for prefetching address translation instructions.

FIG. 4 is a process flow diagram of another example method 400 for software translation prefetch instructions. The method 400 can be implemented with any suitable computing device, such as the computer system 100 of FIG.

1. Method 400 of FIG. 4 may be implemented in processor 200 of FIG. 2. In block 401 of FIG. 4, a translation prefetch instruction, which in an embodiment is part of the ISA of the processor 200, is in one or more aspects encountered in software (e.g., software 111) that is being executed by the processor 200. The translation prefetch instruction may include a virtual memory address in some embodiments. In block 402, the translation corresponding to the translation prefetch instruction misses in the TLB 205. Next, in block 403, an entry is reserved in the translation miss queue 206 for the translation prefetch instruction. In block 404, based on the entry being reserved in the translation miss queue 206, the translation prefetch instruction is retired (or completed) in the pipeline of the processor core 201. In some embodiments, processor core 201 may handle a limited number of instructions simultaneously, and retiring the translation prefetch instruction allows the processor core 201 to begin processing another instruction while the translation prefetch instruction is handled by the translation prefetch engine 204.

In block 405, an address translation request is issued by the translation prefetch engine 204 based on the entry corresponding to the translation prefetch instruction in the translation miss queue 206. The address translation request may be sent to, for example, a table walk unit that performs the address translation by accessing a page table, for example page table 209 in the main memory 208 of FIG. 2. In one or more embodiments, the table walk unit may access a page table in a lowest level cache (e.g., low level cache 203) of the processor 200. In block 406, an address translation is returned to the translation prefetch engine 204 in response to the address translation request of block 405. In block 407, the address translation is stored in the TLB 205. In one or more embodiments, the address translation that is received in block 406 may be stored in a cache (e.g., high level cache 202 or low level cache 203) of the processor 200 in block 407. In such embodiments, the translation prefetch instruction may specify where to store the address translation. The address translation corresponding to the translation prefetch instruction in the TLB may be used by, for example, a subsequent data prefetch instruction, thereby reducing the amount of time required to perform the data prefetch. In block 408, it is determined that processing of the translation prefetch instruction is complete, and the entry in the translation miss queue 206 corresponding to the translation prefetch instruction is released.

The process flow diagram of FIG. 4 is not intended to indicate that the operations of method 400 are to be executed in any particular order, or that all of the operations of method 400 are to be included in every case. Additionally, method 400 can include any suitable number of additional operations.

Prefetch instructions, and other instructions that do not modify the architectural state, such as, for example, cache management instructions, are useful performance tools that can for example put the cache in a more optimal state, provide hints to the hardware about what memory will be accessed in the future, and other various actions to enhance processor performance. Processing these instructions, however, does not always result in performance gains and in circumstances execution of cache management instructions, prefetch instructions, or other performance enhancing instructions that do not affect the architectural state of the processor, hurt performance. For example, if a prefetch instruction wants to load data into the L1 cache and the load queue is near full, it is probably less worthwhile to do the prefetch since loads doing current work should not be sacrificed for a load operation to do future work. In such circumstances, not processing the prefetch instruction and/or not performing the prefetch operation could provide better performance.

A system and method to dynamically modify, change, and/or degrade non-architectural instructions when conditions are such that their execution will result, or are likely to result, in decreased performance is disclosed. Such non-architectural instructions include prefetch instructions, cache management instructions or operations, and other instructions. In one or more embodiments, the process is implemented with logic in the processor (microprocessor). The advantages include that software and processor performance will not be hurt (or at least hurt less) by these instructions that are intended to increase performance, but which in circumstances harm performance. In one or more embodiments, the improvement is implemented in the microprocessor and software will reap the benefit without any additional work.

Since instructions that do not modify any architected state of the processor can be entirely ignored by the hardware and still achieve the correct functional results expected by the software, in one or more embodiments such instructions can be blocked, ignored, cancelled, marked complete (even if not executed), or otherwise not performed. In other instances, even if the entire instruction is not completed, performance of some intermediate work or portions of the instruction can be useful. The amount of the instruction to complete, and/or whether to end the operation early can be determined dynamically. In this regard, instructions that do not modify the architectural state of the processor can be completely skipped (cancelled, ignored, blocked, marked complete even if not performed, etc.), executed in some partial manner, modified, or fully executed. For example, a request to prefetch data in memory in an embodiment is done with a virtual address that must be translated into a real address before the data can be fetched from memory. Performing that address translation can be a useful performance boost even without performing the actual memory fetch, because when a later access is made to that data in memory, the address translation miss step can be skipped.

In one or more embodiments, determining how much to modify, change, and/or degrade (or perform) an instruction that does not modify the architectural state of the processor can be done using known measures, or yet to be discovered measures, of performance or utilization. Measures of performance or utilization can be something simple such as, for example, measuring a particular resource's utilization, or a complex heuristic. In one or more examples, whether to modify or degrade the instruction, and how much to degrade the instruction, can be based upon how full the relevant queues are (e.g., queue utilization), bandwidth utilization, processor power utilization, and frequency of helpful instructions, to name just a few.

Figure 5:
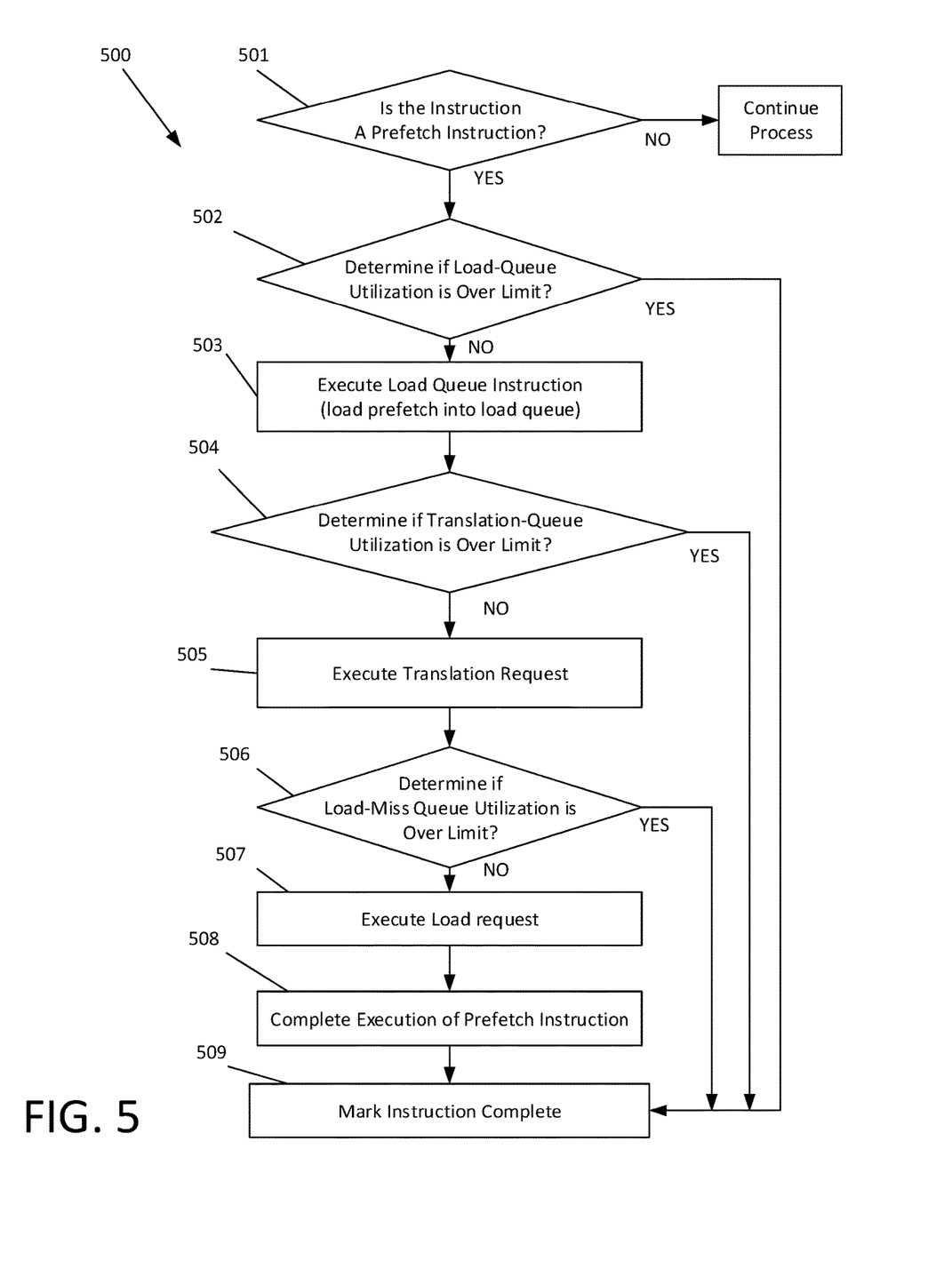
FIG. 5 is a process flow diagram of another example method for prefetching address translation instructions.

FIG. 5 is a process flow diagram of an example method 500 for processing translation prefetch instructions, preferably software translation prefetch instructions, that in one or more embodiments can be modified, changed, and/or degraded, preferably dynamically modified, changed, and/or degraded. The method 500 can be implemented with any suitable computing device, such as the computer system 100 of FIG. 1. Method 500 of FIG. 5 may be implemented in processor 200 of FIG. 2. In block 501 of FIG. 5, in the exemplary method 500 of processing translation prefetch instructions, it is determined whether the instruction is a translation prefetch instruction. If the instruction is not a translation prefetch instruction (501: No), then the process continues to process the instruction, and the processing will depend upon the type of instruction. If the instruction is a translation prefetch instruction (501: Yes), then the process 500 continues to block 502.

At block 502 it is determined if utilization of the load queue is over a threshold or limit. In one or more embodiments, load queue utilization can be used to measure whether to process the prefetch instruction. In an aspect, load queue utilization is a measure of how full the load queue is. While this aspect of method 500 looks at load queue utilization to determine whether to proceed in processing the prefetch instruction, it can be appreciated that other measures of performance or criteria can be used to determine whether to proceed with processing the prefetch instruction. In addition, the threshold or limit in one or more embodiments can be predetermined, or in one or more aspects can be dynamic in that it can be varied depending upon conditions of the processor and/or functional units. If the load queue utilization is over the threshold or limit (502: Yes), then the process continues to 509 where the prefetch instruction is marked or treated as if it has been completed (even though the instruction is not being executed). In other aspects, the instruction can be ignored, blocked, cancelled, or prevented from being further processed. If the load queue utilization is not over the threshold or limit (502: No), then the process continues to block 503 where the load queue instruction is executed, e.g., the prefetch instruction is loaded into the load queue. In this regard, the process continues to execute the prefetch instruction. In one or more embodiments, continuing to execute the instruction includes checking the TLB for the translation, and if the requested translation is in the TLB (there is a TLB hit), then there is no need to prefetch the address translation from main memory and the translation prefetch translation is complete.

After block 503 the process continues to block 504 where it is determined if utilization of the translation queue is over a limit or threshold utilization. In an aspect, translation queue utilization is a measure of how full the translation queue is. While this aspect of method 500 looks at translation queue utilization to determine whether to proceed in processing the prefetch instruction, it can be appreciated that other measures of performance or criteria can be used to determine whether to proceed with processing the prefetch instruction. If the translation queue utilization is over a threshold utilization or limit (504: Yes), then the process continues to 509 where the prefetch instruction is marked or treated as if it has been completed (even though the instruction is not being executed). In other aspects, the instruction can be ignored, blocked, cancelled, or prevented from being further processed. If the translation queue utilization is not over the threshold or limit (504: No), then the process continues to block 505 where the translation request is performed. In this regard, the process 500 can continue to execute the address translation request by the translation prefetch engine 204. That is, in an aspect, the address translation request can be sent to, for example, a table walk unit that performs the address translation by accessing a page table, for example page table 209 in main memory 208 of FIG. 2. In one or more embodiments, the table walk unit may access a page table in a lowest level cache (e.g., low level cache 203) of the processor. The address translation in one or more aspects is returned to the translation prefetch engine.

After block 505 the translation still needs to be loaded into the TLB. The process 500 in an aspect continues to block 506 where it is determined if utilization of the load-miss queue is over a threshold utilization or limit. In an aspect, load-miss queue utilization is a measure of how full the load-miss queue is. While this aspect of method 500 looks at load-miss queue utilization to determine whether to proceed in processing the prefetch instruction, it can be appreciated that other measures of performance or criteria can be used to determine whether to proceed with processing the prefetch instruction. If at block 506 it is determined that the load-miss queue utilization is over a threshold utilization or limit (506: Yes), then the process 500 continues to block 509 where the prefetch instruction is marked as complete (even though the instruction is not being executed). In other aspects, the instruction can be ignored, blocked, cancelled, or prevented from being further processed. If at block 506 it is determined that the load miss queue utilization is not over a threshold utilization or limit (506: No), then the process 500 continues to block 507 where the load request is executed, and the translation is stored in the TLB for use by the processor. After block 507 the process 500 continues to block 508 where the prefetch instruction is completed. The process after block 508 continues to block 509 where the prefetch instruction is marked complete. If the process was not complete after block 507, for example the original request was a data prefetch request that required an address translation (or translation prefetch), then the process would keep proceeding until the instruction naturally completes, or completes due to early termination.

While the above exemplary process 500 refers to being over or under the queue utilization threshold/limit, it should be appreciated that the system and techniques could be implemented where the queue utilization can be equal to or over the queue utilization limit or threshold, and/or equal to or under the queue utilization limit or threshold, and determining where the equal designation resides could be a matter of design choice.

While the exemplary process 500 uses queue utilization to measure performance, e.g., as performance criteria, to determine the extent to which the prefetch instruction should be performed, it should be appreciated that the performance or utilization measurement can encompass many different parameters and measurements. For example, actively measuring load bandwidth could be utilized. A table in hardware could also be implemented, similar to a branch prediction table, to determine whether or not a prefetch instruction is likely to have a positive benefit. Other examples could include where a L1 cache load prefetch has made it to the point where it wants to get in the load-miss queue, but the load-miss queue is near full (above threshold limit). The hardware could look back at the load queue and try to determine if a large number of loads will soon be making a load-miss request. If there are such a large number of loads soon to make a load-miss request, the process/system could drop the prefetch (e.g., mark complete, even though not executed).

While process 500 in FIG. 5 illustrates in aspects the instruction not being executed, or undergoing partial execution, before being marked as complete notwithstanding that the prefetch instruction was not completed, alternatively, instead of dropping the prefetch instruction, the system and/or process could modify the instruction. For example, instead of dropping the prefetch instruction, the system could convert a L1 prefetch to an L3 cache prefetch, which will only allocate the load-miss queue for a short period of time to send the request to the L3 cache. The load-miss queue slot will be immediately freed since the L3 cache is going to handle the prefetch. The data is not as close as originally intended (not loaded to L1 cache), but it is closer than before the prefetch was executed.

While the above dynamic modification of prefetch instructions is diagrammatically illustrated in FIG. 5 and explained in process 500, it can be appreciated that the process, method, and system of dynamically modifying, changing, or degrading prefetch instructions has application to other instructions that do not modify the architectural state of the processor. For example, cache management and other operations and instructions are also covered including for example, data cache block flush instructions which tell the processor to flush specified cachelines out of all the caches and move them back to memory. Data cache block store instructions which tell the processor to write any modified data in the system for the specified cacheline back to main memory is another example instruction that could be subject to dynamic modification, change and/or degradation. The disclosure is not limited to prefetch operations and is not limited to processing of data and/or translation prefetch instructions or operations. Depending upon the design of the processor and system, other instructions that do not modify the architectural state of the processor are contemplated.

Figure 6:
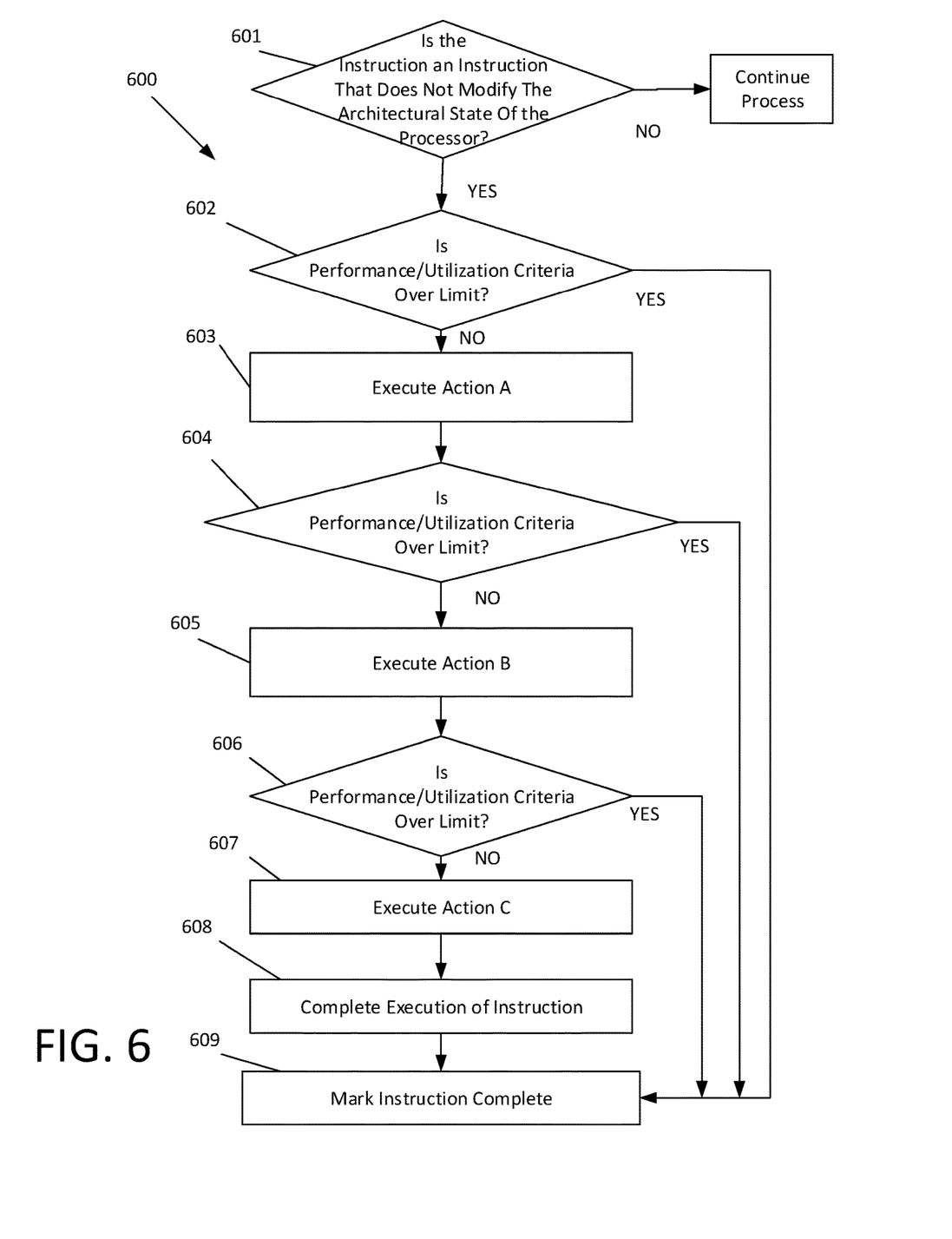
FIG. 6 is a process flow diagram of an example method for dynamic modification of the processing of instructions that do not modify the architectural state of a processor.

FIG. 6 is a process flow diagram of an example method 600 for processing instructions that do not modify the architectural state of a processor, e.g. cache management operations. In one or more embodiments, the processing of the instructions that do not modify the architectural state of the processor can be modified, changed, and/or degraded (down-graded), preferably dynamically modified, changed, and/or degraded. The method 600 can be implemented with any suitable computing device, such as the computer system 100 of FIG. 1. Method 600 of FIG. 6 may be implemented in CPU 101 of computer system 100 or processor 200 of FIG. 2. In block 601 of FIG. 6, in the exemplary method 600, it is determined whether the instruction is an instruction that does not modify the architectural state of the processor. If the instruction does modify the architectural state of the processor (601: No), then the process continues to process the instruction, which processing will depend upon the type of instruction. If the instruction is an instruction that does not modify the architectural state of the processor (601: Yes), then the process 600 continues to block 602.

At block 602, a first performance and/or utilization criteria is checked to determine whether or not processing (execution) of the instruction that does not modify the architectural state of the processor should continue. If the first performance or utilization check indicates that resources are being fully (or nearly fully) utilized, further processing of the instruction would not provide much benefit, or that further processing of the instruction might hurt performance of the processor or operation of the program, e.g., the first performance criteria is not over a first performance threshold (602: No), then the process could continue to 609 where the instruction is marked as complete and is not processed. In other aspects, the instruction can be ignored, blocked, cancelled, or prevented from being further processed. If the first performance or utilization check indicates that processing the instruction that does not modify the architectural state of the processor would be beneficial and/or would not hinder resources, e.g., the first performance criteria is under a first performance threshold (602: Yes), then the process could continue to block 603 where processing the instruction can continue, e.g., execute action A.

The process continues, after block 603 where action A is executed, to block 604 where a second performance and/or utilization criteria is checked to determine whether or not processing (execution) of the instruction that does not modify the architectural state of the processor should continue. If the second performance or utilization check indicates that resources would not provide much benefit, or further processing of the instruction might hurt performance of the processor or operation of the program, e.g., the second performance criteria is not over a second performance threshold (604: No), then the process would continue to 609 where the instruction is marked as complete and is not processed. In other aspects, the instruction can be ignored, blocked, cancelled, or prevented from being further processed. If the second performance or utilization check indicates that processing the instruction that does not modify the architectural state of the processor would be beneficial and/or would not hinder resources, e.g., the second performance criteria is under a second performance threshold (604: Yes), then the process could continue to block 605 where processing the instruction can continue, e.g., execute action B.

After block 605 where action B is executed, the process continues to block 606 where a third performance and/or utilization criteria is checked to determine whether or not processing (execution) of the instruction that does not modify the architectural state of the processor should continue. If the third performance or utilization check indicates that resources would not provide much benefit, or further processing of the instruction might hurt performance of the processor or operation of the program, e.g., the third performance criteria is not over a third performance threshold (606: No), then the process would continue to 609 where the instruction is marked as complete and is not processed. In other aspects, the instruction can be ignored, blocked, cancelled, or prevented from being further processed. If the third performance or utilization check indicates that processing the instruction that does not modify the architectural state of the processor would be beneficial and/or would not hinder resources, e.g., the third performance criteria is under a third performance threshold (606: Yes), then the process could continue to block 606 where processing the instruction can continue, e.g., execute action C.

This processing of the instruction where further performance/utilization criteria is checked to determine if execution of the instruction should continue is repeated until the instruction is completed at block 608. At block 609 the instruction is marked as complete. The specifics of what performance or utilization criteria is used in the system or techniques can be varied as can the type of instruction with which the instruction modification techniques or system can be applied to can be varied. It can be appreciated that the specifics of the modification techniques will vary with the type of instruction, the design, configuration, and architectural state of the processor, and how the processor processes the underlying instructions that do not modify the architectural state of the processor.

While the above exemplary process 600 refers to being over or under the performance and/or utilization criteria limit/threshold, it should be appreciated that the system and techniques could be implemented where the performance and/or criteria utilization can be equal to or over the performance and/or criteria utilization limit or threshold, and/or equal to or under the performance and/or criteria utilization limit or threshold, and determining where the equal designation resides could be a matter of design choice.

The present techniques may be a system, a method or an apparatus. The flowchart and block diagrams in the Figures illustrate the architecture, functionality, and operation of possible implementations of systems, methods, and apparatus according to various embodiments of the present techniques. In this regard, each block in the flowchart or block diagrams may represent a module, segment, or portion of logic for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

One or more embodiments of the present disclosure may be a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Moreover, a system according to various embodiments may include a processor and logic integrated with and/or executable by the processor, the logic being configured to perform one or more of the process steps recited herein. By integrated with, what is meant is that the processor has logic embedded therewith as hardware logic, such as an application specific integrated circuit (ASIC), a field programmable gate array (FPGA), etc. By executable by the processor, what is meant is that the logic is hardware logic; software logic such as firmware, part of an operating system, part of an application program; etc., or some combination of hardware and software logic that is accessible by the processor and configured to cause the processor to perform some functionality upon execution by the processor. Software logic may be stored on local and/or remote memory of any memory type, as known in the art. Any processor known in the art may be used, such as a software processor module and/or a hardware processor such as an ASIC, a FPGA, a central processing unit (CPU), an integrated circuit (IC), a graphics processing unit (GPU), etc.

The corresponding structures, materials, acts, and equivalents of all means or step plus function elements in the claims below are intended to include any structure, material, or act for performing the function in combination with other claimed elements as specifically claimed. The description of the embodiments of the present disclosure has been presented for purposes of illustration and description, but is not intended to be exhaustive or limited to the embodiments in the form disclosed. Many modifications and variations will be apparent to those of ordinary skill in the art without departing from the scope and spirit of the disclosure. The embodiments and examples were chosen and described in order to best explain the principles of the disclosure and the practical application, and to enable others of ordinary skill in the art to understand the disclosure for various embodiments with various modifications as are suited to the particular use contemplated.

The programs described herein are identified based upon the application for which they are implemented in a specific embodiment of the disclosure. However, it should be appreciated that any particular program nomenclature herein is used merely for convenience, and thus the disclosure should not be limited to use solely in any specific application identified and/or implied by such nomenclature.

It will be clear that the various features of the foregoing systems and/or methodologies may be combined in any way, creating a plurality of combinations from the descriptions presented above.

It will be further appreciated that embodiments of the present disclosure may be provided in the form of a service deployed on behalf of a customer to offer service on demand.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A system, comprising a processor configured to:
   based on encountering a prefetch instruction that is being executed by the processor:
   determine whether utilization of a first queue used in processing the prefetch instruction is over a first queue utilization limit;
   in response to the first queue utilization being over the first queue utilization limit, do not execute the prefetch instruction;
   in response to the first queue utilization being under the first queue utilization limit, at least partially process the prefetch instruction;
   based on the first queue utilization being under the first queue utilization limit, determine whether utilization of a second queue used in processing the prefetch instruction is over a second queue utilization limit;
   in response to the second queue utilization being over the second queue utilization limit, do not further execute the prefetch instruction; and
   in response to the second queue utilization being under the second queue utilization limit, at least partially further process the prefetch instruction.

2. The system of claim 1, wherein in response to the first queue utilization being over the first queue utilization limit, mark the prefetch instruction complete notwithstanding that the prefetch instruction is not executed.

3. The system of claim 1, wherein the prefetch instruction is a translation prefetch instruction in software.

4. The system of claim 1, wherein the processor is further configured to:
   based on the second queue utilization being under the second queue utilization limit, determine whether utilization of a third queue used in processing the prefetch instruction is over a third queue utilization limit;
   in response to the third queue utilization being over the third queue utilization limit, do not further execute the prefetch instruction; and
   in response to the third queue utilization being under the third queue utilization limit, at least partially further process the prefetch instruction.

5. The system of claim 1, wherein the first queue is a load queue.

6. The system of claim 1, wherein the second queue is at least one of the group comprising a translation queue and a load-miss queue.

7. The system of claim 1, wherein the processor is further configured to, in response to the first queue utilization being equal to the first utilization limit, not execute the prefetch instruction.

8. A computer-implemented method, comprising:
   based on encountering an instruction that does not modify the architectural state of a processor that is being executed by the processor:
   determine, by the processor, whether a first performance criteria used in processing the instruction is over a first performance threshold;
   in response to the first performance criteria being over the first performance threshold, do not execute the instruction;

in response to the first performance criteria being under the first performance threshold, at least partially process the instruction;

based on the first performance criteria being under the first performance threshold, determine whether a second performance criteria used in processing the instruction is over a second performance threshold;

in response to the second performance criteria being over the second performance threshold, do not further execute the instruction; and in response to the second performance criteria being under the second performance threshold, at least partially further process the instruction.

9. The computer-implemented method of claim 8, wherein the instruction that does not modify the architectural state of the processor is at least one of the group consisting of a prefetch instruction, a cache management instruction, and combinations thereof.

10. The computer-implemented method of claim 8, further comprising in response to the first performance criteria being over the first performance threshold, mark the instruction complete notwithstanding that the instruction is not executed.

11. The computer-implemented method of claim 8, wherein the first performance criteria is at least one of the group comprising: how full at least one queue is that is used to process the instruction, load bandwidth, processor power utilization, the frequency at which the instruction increases performance, and combinations thereof.

12. The computer-implemented method of claim 8, wherein the instruction is a translation prefetch instruction and the first performance criteria is at least one of the group comprising utilization of a load queue, utilization of a translation queue, utilization of a load-miss queue, and combinations thereof.

13. The computer-implemented method of claim 8, further comprising:
based on the second performance criteria being under the second performance threshold, determine whether a third performance criteria used in processing the instruction is over a third performance threshold;
in response to the third performance criteria being over the third performance threshold, do not further execute the instruction; and
in response to the third performance criteria being under the third performance threshold, at least partially further process the instruction.

14. An apparatus, comprising hardware logic configured to:
based on encountering a prefetch instruction that is being executed by the processor:
determine whether utilization of a first queue used in processing the prefetch instruction is over a first queue utilization limit;
in response to the first queue utilization being over the first queue utilization limit, do not execute the prefetch instruction;
based on determining the first queue utilization is under the first queue utilization limit, determine whether utilization of a second queue used in processing the instruction is over a second queue utilization limit;
in response to the second queue utilization being over the second queue utilization limit, do not further execute the instruction; and
in response to the second queue utilization being under the second queue utilization limit, at least partially further process the instruction.

15. The apparatus of claim 14, wherein the hardware logic is configured to: in response to the first queue utilization being over the first queue utilization limit, mark the prefetch instruction complete notwithstanding that the prefetch instruction is not executed.

16. The apparatus of claim 14, wherein the hardware logic is configured to process the prefetch instruction and the prefetch instruction is a translation prefetch instruction in software.

17. The apparatus of claim 16, wherein the first queue utilization is at least one of the group comprising utilization of a load queue, utilization of a translation queue, utilization of a load-miss queue, and combinations thereof.

18. The apparatus of claim 14, wherein the hardware logic is configured to:
based on the second queue utilization being under the second queue utilization limit, determine whether utilization of a third queue used in processing the instruction is over a third queue utilization limit;
in response to the third queue utilization being over the third queue utilization limit, do not further execute the instruction; and
in response to the third queue utilization being under the third queue limit, at least partially further process the instruction.

* * * * *